United States Patent
Fleissner

[15] 3,672,010
[45] June 27, 1972

[54] APPARATUS FOR THE CONTINUOUS TREATMENT OF TEXTILE MATERIALS

[72] Inventor: Heinz Fleissner, Egelsbach near Frankfurt/Main, Germany

[73] Assignee: Vepa AG

[22] Filed: Nov. 21, 1969

[21] Appl. No.: 877,565

Related U.S. Application Data

[60] Division of Ser. No. 831,686, June 9, 1968, Pat. No. 3,521,378, which is a continuation-in-part of Ser. No. 654,728, July 20, 1967, Pat. No. 3,503,134.

[30] Foreign Application Priority Data

| | | |
|---|---|---|
| June 8, 1968 | Germany | P 17 60 604.1 |
| June 22, 1968 | Germany | P 17 60 717.9 |
| June 27, 1968 | Germany | P 17 60 751.1 |
| April 8, 1969 | Germany | P 19 17 757.2 |

[52] U.S. Cl. .................. 26/60, 26/18.5, 34/115, 34/120, 68/DIG. 5
[51] Int. Cl. .............. D06c 3/02, F26b 3/06, F26b 13/30
[58] Field of Search ............ 34/115, 117; 26/18.5, 52, 60, 26/61 A, 62 A, 68; 68/DIG. 5

[56] References Cited

UNITED STATES PATENTS

| | | | |
|---|---|---|---|
| 2,890,526 | 6/1959 | Fleissner | 68/DIG. 5 |
| 2,919,496 | 1/1960 | Fleissner | 68/DIG. 5 |
| 380,139 | 3/1888 | Scholfield | 26/60 |
| 408,492 | 8/1889 | Lindley | 26/60 X |
| 2,219,213 | 10/1940 | Swain | 26/60 X |
| 3,380,175 | 4/1968 | Fleissner et al. | 34/115 |

FOREIGN PATENTS OR APPLICATIONS

| | | | |
|---|---|---|---|
| 26,344 | 3/1884 | Germany | 26/60 |
| 1,018,531 | 1/1966 | Great Britain | 34/115 |

Primary Examiner—Robert R. Mackey
Attorney—Craig, Antonelli & Hill

[57] ABSTRACT

The present disclosure is directed to an apparatus for the treatment of materials which comprises a heat-insulated treatment chamber, a plurality of sieve drum means subjected to a suction draft rotatably disposed within said treatment chamber, fan means associated with the sieve drum means for producing a suction draft and for circulating the treatment medium in said treatment chamber, heating means provided in the circulation zone of the treatment medium, tentering means containing tensioning chains at least partially disposed outside of the treatment chamber serving as inlet means for said material, said tentering means cooperating with the sieve drum means for the effective conveyance of the material being treated to avoid shrinkage within said treatment chamber and outlet means for removing the material being treated from the treatment chamber.

5 Claims, 2 Drawing Figures

Inventor:
HEINZ FLEISSNER

By Craig, Antonelli, Stewart & Hill
ATTORNEYS

3,672,010

APPARATUS FOR THE CONTINUOUS TREATMENT OF TEXTILE MATERIALS

CROSS REFERENCE TO RELATED APPLICATIONS

This application is a division of application Ser. No. 831,686, filed on June 9, 1968, now U.S. Pat. No. 3,521,378, granted on July 21, 1970, which application is a continuation-in-part of application Ser. No. 654,728, filed on July 20, 1967, now U.S. Pat. No. 3,503,134, granted on Mar. 31, 1970.

The present invention relates to an apparatus for the treatment, e.g. drying, steaming, fixing, condensing and the like, of materials, particularly textile materials, such as cloth, knit fabrics, composite fiber materials, tufted goods, etc., by utilizing a gaseous treatment medium, for example air, steam, or steam-air mixtures. The apparatus of the present invention includes a heat-insulated housing containing as the conveying means at least one sieve means subjected to a suction draft, preferably a perforated sieve drum means, and one or more fan means for the generation of said suction draft and for the purposes of circulating the treatment medium. A heating means is also provided for heating the treatment medium.

It is known to combine devices of this type with a tentering device in such a manner that the material is guided, while being stretched along its width, directly up to the placement or transfer of said material to the conveying means subjected to a suction draft. Such a guidance of the material preliminary to its introduction onto a conveying means subjected to a suction draft exhibits the advantage that the width of the wide-stretched material is substantially retained by the suction draft and thus is prevented from shrinking.

The utilization of the throughflow principle and the conveyance on perforated sieve conveying means during the treatment affords considerable advantages as compared to a sole tenter frame treatment. The particular advantages of the throughflow principle include extremely brief treatment times and an extremely uniform treatment effect. By placing the material on sieve means during the treatment process, a more uniform character of the materials is obtained, particularly in the case of fixing treatments and generally in the case of treating mesh material. By the utilization of a tentering station, the material can be prestretched to a specific width. Furthermore, spin folds (creases) can also be substantially eliminated, and a good shrinkage of the material can be achieved, for example, by steaming of the material in the tentering zone.

In order to eliminate the spin creases, and in order to stretch the material to a specific width, a certain length of the tentering station is required, for example, at least about 4 meters or more. The longer the tentering station, the more favorably affected is the material. However, lengthening the tentering station is expensive and in addition produces the disadvantage that the space requirements become correspondingly larger. In general, only a limited space is available for such treatment plants. Therefore, it is desired to keep the plant as short in length as possible. By employing the perforated drum principle, a shortening of the treatment time and thus also a shortening of the length of the treatment plant can be achieved. However, in the case of treating various materials which tend to shrink substantially in fiber fixing processes, the suction draft of the perforated drum alone is insufficient for preventing these materials from shrinking in their width. For example, fabrics and textile webs of polypropylene exhibit a higher shrinking capacity. Thus, it is advantageous for textile webs which tend to shrink greatly to be heated to the treatment temperature while they are still held in the tentering chains of the tentering zone, that is, before they are freely guided onto the surfaces of perforated sieve drums subjected to a suction draft.

SUMMARY OF THE INVENTION

The object of the present invention is to avoid the prior art disadvantages in the treatment of textile materials.

A further object of the present invention is to provide an improved apparatus for the treatment of textile materials wherein a substantial reduction in apparatus cost and space can be achieved thereby making the present system economically advantageous.

Other objects and further scope of applicability of the present invention will become apparent from the detailed description given hereinafter; it should be understood, however, that the detailed description, while indicating a preferred embodiment of the invention, is given by way of illustration only, since various changes and modifications within the spirit and scope of the invention will become apparent to those skilled in the art from this detailed description.

Pursuant to the present invention, it has been found that the above-mentioned disadvantages may be eliminated and a much improved apparatus for the treatment of textile materials may be obtained by a unique combination of a plurality of sieve drum means in a housing and a tentering means operatively associated therewith.

According to one embodiment of the present invention, a particularly compact structure can be obtained by extending the tentering elements of the tentering station below all perforated drums to the rearmost perforated drum, so that these elements transfer the material onto this drum. In this connection, it is advantageous in many cases to provide the rearmost perforated drum with a larger diameter than the other perforated drums. However, it is also possible to extend the tentering elements below the housing to a point in close proximity to the rearmost perforated sieve drum. However, in many cases it is more advantageous to extend the tentering elements in the housing up to the last perforated sieve drum, since it is thereby possible to pretreat the material while it is simultaneously being conveyed on the tentering chains.

If the apparatus is also to be used for fixing processes, then a cooling unit is generally additionally required, said cooling unit quenching the material after the fixing treatment. Accordingly, it is suggested to dispose a cooling unit, preferably a perforated drum subjected to a suction draft, above the tentering station.

In order to obtain a flawless guidance of the material during removal from the perforated drum disposed in the treatment chamber, it is proposed to arrange at least one outlet roll at the exit of the device. From this roll, the material being treated can then be conveyed to the cooling unit. It is also advantageous to provide this roll at the outlet as a perforated roll. Thus, it is possible to take in the air drawn in by the device at the outlet through the roll and through the material guided on said roll, and thus precool the material and simultaneously preheat the drawn-in fresh air. This provides a very economical mode of operation.

BRIEF DESCRIPTION OF THE DRAWINGS

The present invention will become more fully understood from the detailed description given hereinbelow and to the accompanying drawings which are given by way of illustration only and thus are not limitative of the present invention and wherein.

DESCRIPTION OF THE PREFERRED EMBODIMENTS

Figure 1:
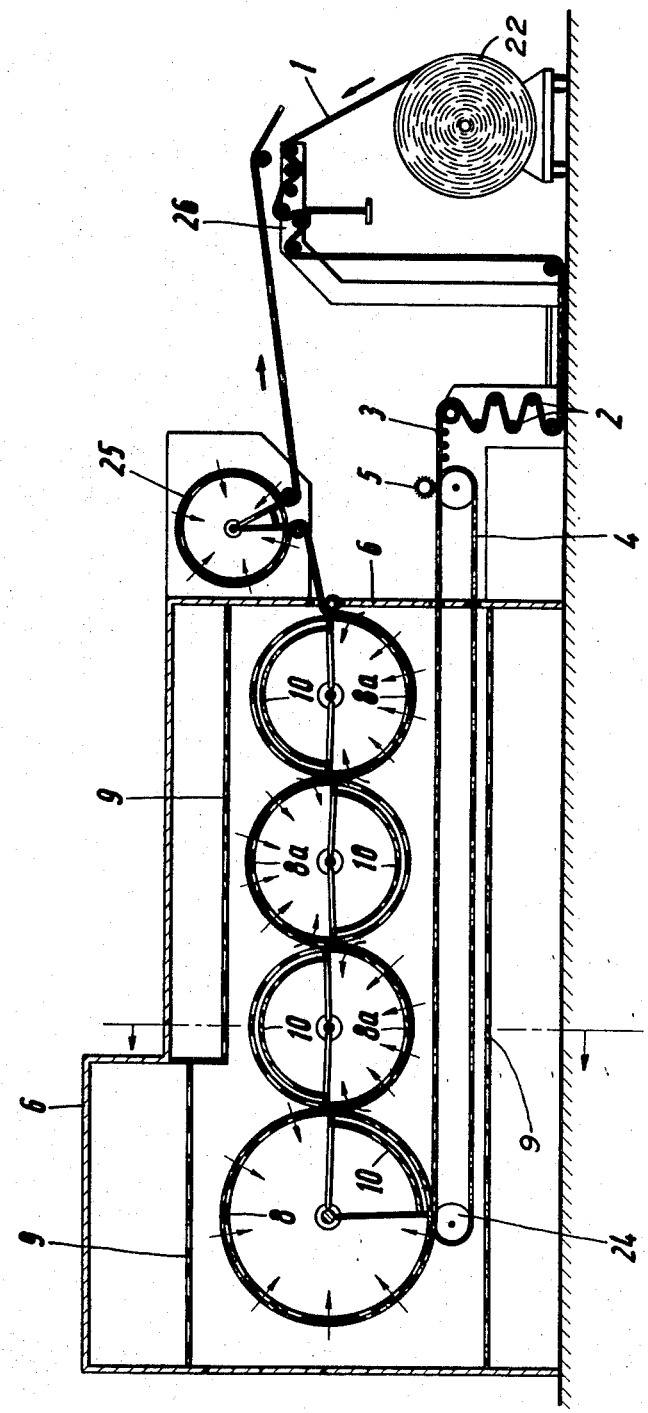
FIG. 1 shows a longitudinal sectional view of a plurality of sieve drum means located in a treatment chamber and tentering means extending along said sieve drum means in said treatment chamber.
Figure 2:
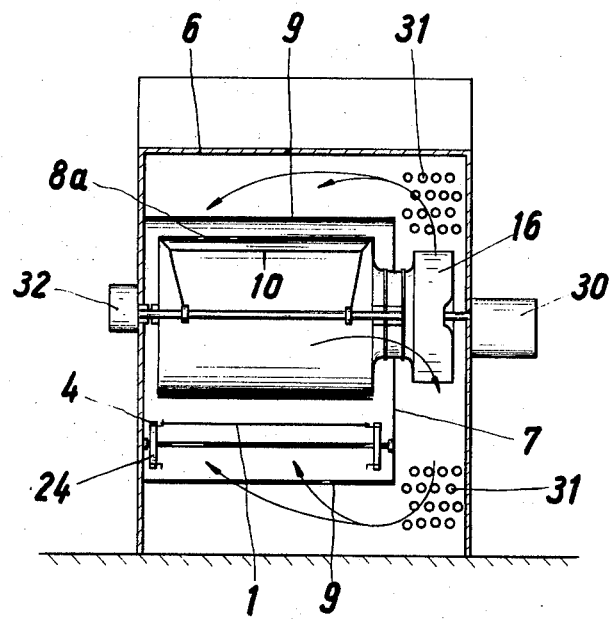
FIG. 2 shows a cross-sectional view through the apparatus of FIG. 1.

Referring now the drawings wherein like reference numerals are used throughout FIGS. 1 and 2 to designate like parts of the apparatus according to the invention:

In the apparatus of FIG. 1, a web-shaped material 1 is pulled off a mandrel 22 and guided via frame member 26 and by spreader rolls 2 to the inlet of a tentering station 3, where it is attached to the tentering chains 4 by way of brush rollers 5. In the illustrated embodiment, the tentering chains are constructed as pins, spikes or needle chains having a vertical chain return system. However, it is also possible to employ tentering chains having a horizontal chain return.

The apparatus also includes a heat-insulated housing 6 subdivided by a longitudinal wall 7 into a treatment chamber and a fan chamber, which is customary in perforated sieve drum dryers. Perforated sieve drums 8 and 8a, which are subjected to a suction draft, are disposed in the treatment chamber. The longitudinal wall 7 extends only up to the perforated sieve sheets or covers 9 disposed above and beneath the perforated sieve drums for making the flow of gaseous treatment medium uniform within said treatment chamber.

As shown in FIG. 1, the tentering chains 4, convey the material 1 through the treatment chamber to the large perforated drum 8, where the material 1 is pulled from the pins of the tentering chains 4 by the suction draft of the perforated drum 8. During the time when the material is guided on the tentering chains in the treatment chamber, it is generally already heated to the treatment temperature, so that in this case the tentering chains 4 hold the material by its width during the heating process. A subsequent shrinkage on the perforated drums is thus also avoided in this embodiment. The material 1 is alternately conveyed over the individual perforated drums 8a so that it passes over and under said drums respectively. The portion of the perforated drum which is not covered by the material 1 being treated is shielded from the suction draft by conventional cover plate 10.

In the fan chamber, as shown in FIG. 2, fans 16 are accommodated, these fans being required for the production of the necessary suction draft. These fans blow the gaseous treatment medium drawn from the perforated drums 8,8a, above and below the perforated sieve drums back into the treatment chamber.

Outside of the housing 6, a cooling drum 25 is provided before the material 1 is reeled on a device (not shown).

The cross section of the apparatus is illustrated in FIG. 2. As can be seen therefrom, each perforated drum 8,8a is associated with a radial-flow fan 16, disposed at the front end of the drum. The drive 30 for the fan is attached at the outside of housing 6. Heating units 31 are provided in the fan chamber above and below the fan 16. The drive 32 for the perforated drum 8,8a is mounted on the other side of the housing.

In this embodiment where the tentering station extends to an appreciable extent into the housing and thus into the treatment chamber, a portion of the air drawn by the fans 16 from the perforated sieve drums 8,8a can now be blown against the material underneath the tentering station in the housing. This further exhibits the advantage that in addition to providing that the material being treated is carried on a cushion of air, the material is also exposed to heating and optionally prefixing within the tentering stage.

The invention being thus described, it will be obvious that the same may be varied in many ways. Such variations are not to be regarded as a departure from the spirit and scope of the invention, and all such modifications as would be apparent to one skilled in the art are intended to be included.

It is claimed:

1. An apparatus for the treatment of textile materials which comprises a heat-insulated treatment chamber; a plurality of sieve drum means subjected to a suction draft rotatably disposed within and arranged in a line in said treatment chamber, the last sieve drum means having a substantially larger diameter than the preceding sieve drum means; fan means associated with the sieve drum means for producing a suction draft and for circulating a treatment medium in said treatment chamber; heating means provided in a circulation zone of the treatment chamber; inlet means for introducing a textile material into said treatment chamber, said inlet means including tentering means containing tensioning chains extending into the treatment chamber and substantially through said chamber parallel to and along the plurality of the sieve drum means and terminating near the last sieve drum means, said tentering means holding the textile material to its width during conveyance to said last sieve drum means whereby subsequent shrinkage of said textile material on said sieve drum means is avoided; and outlet means for removing the textile material from the treatment chamber, said inlet and outlet means being provided at the same end of the treatment chamber.

2. The apparatus of claim 1, wherein the inlet means further includes a mandrel associated with a frame member and a plurality of spreader rolls.

3. The apparatus of claim 1, wherein a cooling sieve drum means subjected to a suction draft is disposed adjacent the outlet means.

4. The apparatus of claim 1 wherein the tentering means extends partly inside and partly outside the treatment chamber.

5. The apparatus of claim 1 wherein sieve sheets are disposed in the treatment chamber above and below the sieve drum means.

* * * * *